Nov. 17, 1959   A. C. BODEAU ET AL   2,913,199
VIBRATION ISOLATING MOUNTING
Filed Sept. 29, 1955   2 Sheets-Sheet 1

A.C.BODEAU
E.R.SHULL
INVENTORS

BY
ATTORNEYS

Nov. 17, 1959     A. C. BODEAU ET AL     2,913,199
VIBRATION ISOLATING MOUNTING
Filed Sept. 29, 1955     2 Sheets-Sheet 2
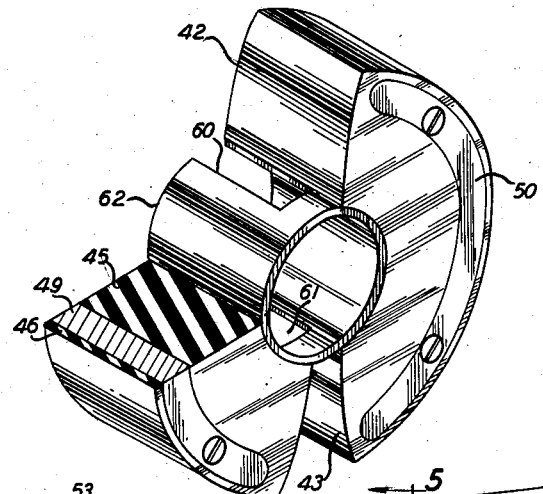
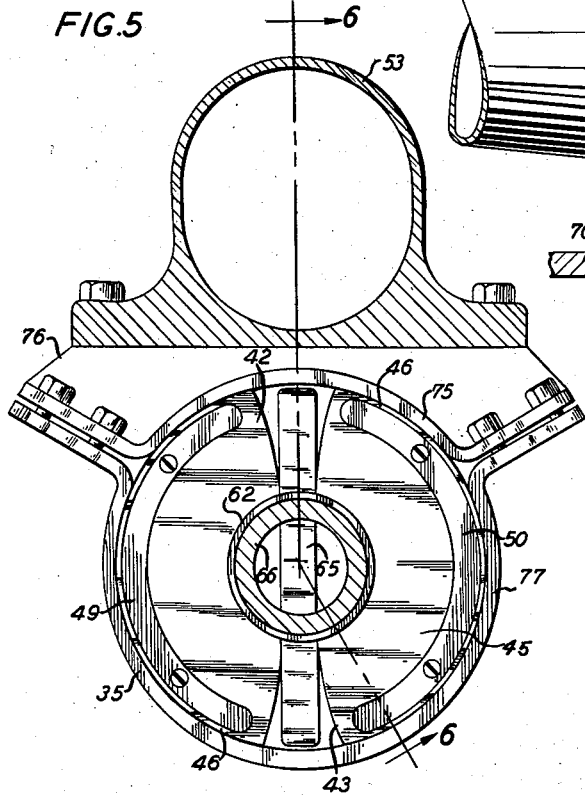
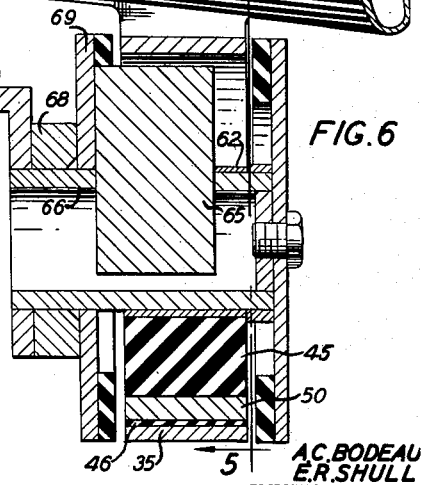
A.C. BODEAU
E.R. SHULL
INVENTORS
ATTORNEYS

United States Patent Office 2,913,199
Patented Nov. 17, 1959

2,913,199

VIBRATION ISOLATING MOUNTING

Arthur C. Bodeau, Grosse Pointe Park, and Eugene R. Shull, Detroit, Mich., assignors to Ford Motor Company, Dearborn, Mich., a corporation of Delaware Application September 29, 1955, Serial No. 537,347

5 Claims. (Cl. 248—8)

This invention relates to vibration isolating mountings, and more particularly to automotive engine mountings.

In vibration producing units, it is generally desirable not only to support and cushion these units in the vertical and horizontal planes, but also to offer angular support and resist angular or torsional vibrations. This has been found difficult in the past because the vertical spring supports were of necessity much stiffer than the torsional spring supports, and in order to satisfy one the other had to be slighted since in mountings of the prior art the same spring properties were used for vertical and angular support and/or for engine torque and torsional vibrations. The problem as it relates to automobile engine mountings is particularly acute because of the limited possible space for mounting, and the fact that all vibrations, be they torsional, vertical, or otherwise, directly relate to passenger comfort. In the automobile engine mountings, therefore, there has been a problem that was very serious.

It is desirable in engine mounting to provide a mounting that will effectively isolate vibratory torque produced by the engine in addition to resisting the mean torque produced by the engine. In order to provide a mounting that will limit engine block rotation to a small degree and yet be elastic enough to isolate undesirable vibrations, a new spring arrangement for the mounting had to be devised. This invention provides for such an arrangement.

In this invention, several different spring rates may be employed at the same time or separately and these spring rates are arranged to offer protection against the various undesirable vibrations as they occur. Following the principles of this invention a vibration resistant mounting may be constructed of an elastic material having a plurality of portions, which may advantageously be of different spring rates, with means to engage these spring or elastic supports selectively.

In the preferred embodiment of the invention as shown in the accompanying drawings, the mount may be formed of an inner elastic portion and an outer elastic portion separated by a relatively inelastic portion with opposed openings formed in the mount. In addition, a central void is formed in the inner elastic portion. Alternately, the mount may be considered as comprised of two elements, each having an inner elastic portion and an outer elastic portion separated by a relatively inelastic portion. The ends of these two elements may be spaced from each other to form openings between them, and the two inner elastic portions of each element may have a portion cut away to form a central void in the vibration mount. Although the mount may be considered to be formed of two elements spaced a suitable distance from each other, it is preferred to describe the invention in terms of a single inner elastic portion and a single outer elastic portion with suitable openings formed therein, and the remainder of the specification will describe the mount in these terms. There is an outer ring of steel about this assembly and this outer ring is fixed in relation to, in this case of the front mounting, an automobile chassis, and an extension of the engine to be mounted fits into the center void mentioned above with two opposed fins, which are also fixed to the engine to be mounted, fitting into the above-mentioned openings. The engine extension is effectively attached to the inner portion of rubber or elastic material so that no rotational slippage is possible. The fins are not bonded or attached to the engine mounting but instead rotate back and forth in the openings as the engine torque increases or decreases. The advantage of this is that when the power plant torque is relatively low and the fins are not riding on either side of the openings, the flexibility of both elastic portions control and their spring constants determine the natural frequency at which the engine will resonate. This effective spring constant may be very low and, therefore, the resonating frequency will be low so that engine vibration frequency will be substantially greater even at a low engine speed and, therefore, resonance will be avoided. As the power plant torque output increases, it is desirable to support the engine rotationally with a higher spring rate. This is possible in this invention because the fins rotate against the wall of the inner elastic portion of greater flexibility which submits to the pressure of the fins and then the stiffer outer elastic portion is effectively engaged as the outer portion of the fins operatively engage the relatively inelastic portion of the vibration mount. Now the engine is restrained torsionally by a spring constant which has the necessary stiffness and the accompanying higher resonating frequency, but since the power plant frequencies are now at a state such that they can be readily isolated with a higher spring rate, the disadvantage of employing a higher spring rate has been substantially eliminated. Of course, as many portions of elastic materials that are necessary to cope with the particular vibrational problem in hand are within the purview of this invention.

The mountings of this invention are advantageously put along the natural torque roll axis of the vibrating body. The natural torque roll axis is that axis about which the vibrating body tends to torsionally vibrate when under a torque about an axis parallel to the crankshaft axis in a given plane. This invention provides a mounting that lends itself to a greater number of placements on an automobile engine and, therefore, can be placed more nearly on the minimum torque axis which has been found difficult to do in the past.

Therefore, an object of this invention is to provide a mounting such as may be used for an automobile engine that will have the advantages of having several different spring constants.

Another object of this invention is to provide a mounting that may more easily be placed on or near the torque roll axis. This invention permits substantially independent selectivity of torsional and radial rates which may be utilized to best advantage through proper placement of the mounts.

Another object of this invention is to provide a mounting that will produce a nonlinear slope to the load versus deflection spring rate curve so as to keep the natural frequencies of the mounted object in relatively harmless ranges as the static torque applied to the mount is varied.

A further object of this invention is to provide a mounting that will offer varying support to the vibrating body as it is needed for a substantially low vibration transmissibility.

Another object of this invention is to provide a mounting that will offer vertical support of one degree of flexibility, and angular or rotational supports of varying degrees of flexibility which are so arranged that they are used as needed to keep vibrations low.

Other objects and advantages of this invention will be made more apparent as this description proceeds, particularly when considered in connection with the accompanying drawings, wherein:

Figure 4 is a cutaway view in perspective of the engine mounting portion of the preferred embodiment;

Figure 5 is a cross section taken at 5—5 of Figure 6;

Figure 6 is a cross section taken at 6—6 of Figure 5, and shows the rear automobile engine mounting.

Figure 1:
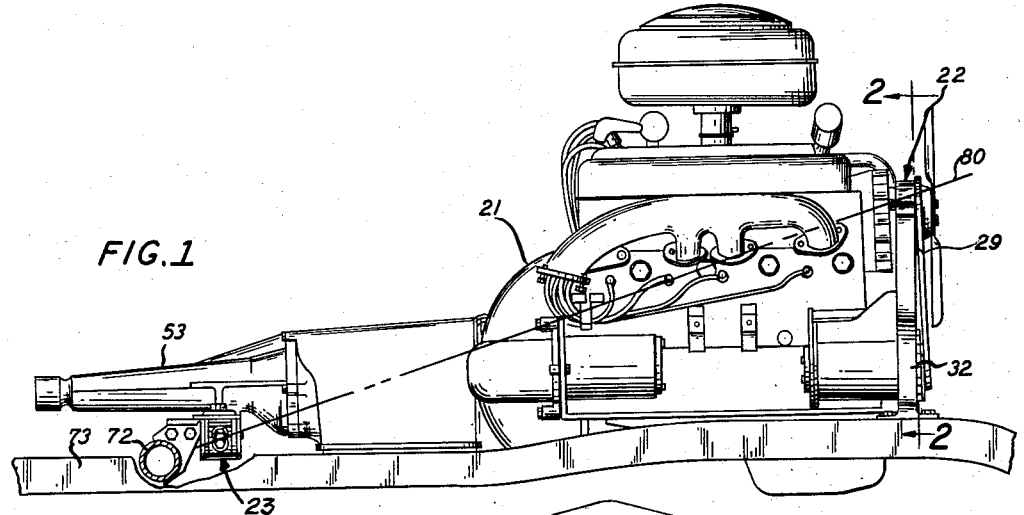
Figure 1 is a plan view of an automobile engine mounted in two places with a preferred embodiment of this invention.

In Figure 1 is shown automobile engine 21 mounted at front and rear with engine mountings 22, 23 respectively. In this embodiment, front mounting 22 is placed over water pump housing 29 and fins 26, 27 which are fixed to the water pump housing 29. Water pump housing 29 and fins 26, 27 are fixed to engine 21 and rotate with the engine block. While the fins in this embodiment are of a rigid nature, it is within the scope of this invention to make them of a semirigid or flexible nature. Looking at Figure 2, it is seen that circular housing 34, 35 is fixed to supports 32, 33 by means of flanges 37, 38 which are fitted to supports 32, 33. The method of fixing the outer surface of the engine mount to housing assembly 34, 35 may be either by tightening the housing securely about engine mounting 40 or by bonding the outer surface of the engine mounting to the housing assembly or any other suitable means. Supports 32, 33 are conveniently fixed to the chassis frame 73. The mounting 40 may be formed of an inner elastic portion 45 and an outer elastic portion 46 having openings 42 and 43 formed therein. As previously pointed out, the mount may be also considered as formed of two inner portions 45 and two outer portions 46 which are spaced at their ends to form openings 42 and 43. The inner and outer portions 45 and 46 may be formed of a synthetic or natural rubber, and have relatively inelastic sector support portions 49 and 50 such as steel bonded to both inner elastic portion 45 and to outer elastic portion 46. The stiffness of the outer elastic portion 46 is approximately ten times that of inner elastic portion 45 although this, as with other variables mentioned herein, may be changed to suit the particular need.

In Figure 4 there is seen more clearly the construction of this mounting. Slots 60, 61 in cylinder 62 are provided for the insertion of fins 26, 27. The number placement and configuration of these slots may be varied as desired. Of course, the narrower openings 42, 43 are, the less the engine block can rotate. Cylinder 62 is bonded to the inner surface of inner portion 45, and sectors 49, 50 are bonded to the outer surface of inner portion 45, and are also bonded to the inner surface of outer portion 46. The outer surface of outer portion 46 may be bonded to housing 34, 35.

Figure 2:
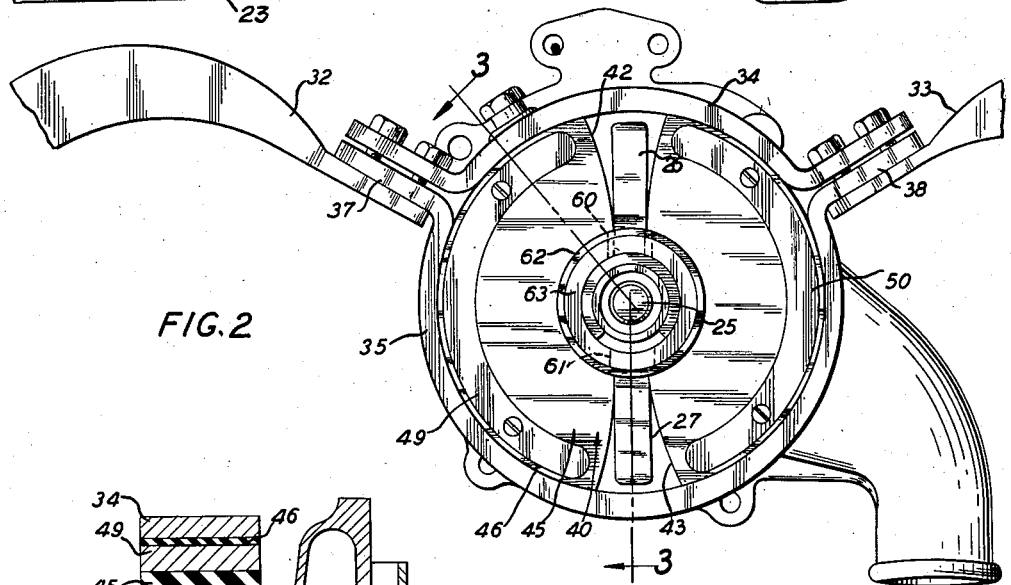
Figure 2 is a view taken at the cross section 2—2 of Figure 1.
Figure 3:
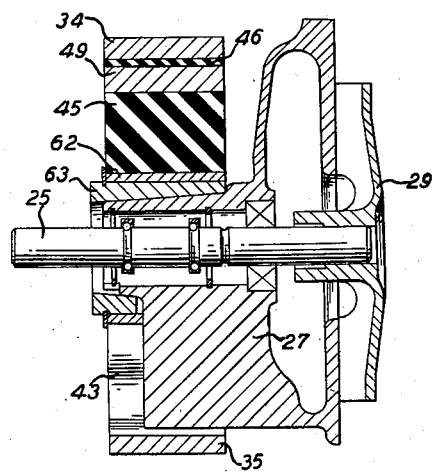
Figure 3 is a view taken at the cross section 3—3 of Figure 2.

Fins 26, 27 are located in the openings 42, 43 and slots 60, 61 in the position shown in Figure 2. With no torque load on the engine, the fins may be located slightly off-center of the openings. However, when the torque load is put on engine 21, the fins will have assumed a position substantially in the center of openings 42, 43. There may be slightly more clearance between the end of fin 27 and housing 35 than there is between the end of fin 26 and housing 34 when the mounting 40 is in an unloaded condition. However, after installation of engine 21 in mounting 40, this extra clearance is taken up, and it becomes substantially equal with the clearance between fin 26 and housing 34.

A similar mounting is placed at the rear of the engine just under drive shaft 53. Looking at Figures 5 and 6, it is seen that fin 65 is welded or otherwise fixed to cylinder 66, and this assembly is slipped inside band 62. Spacer 68 fits between cover plate 69 and support 70 with cylinder 66 extending therethrough. Cylinder 66 is attached to support 70 as by welding and support 70 has been attached to crossmember 72 of chassis 73 which relationship may be seen in Figure 1. Arcuate housing member 75 has extension 76 which is bolted to transmission extension housing 53. Flanged members 75, 77 may be bonded or otherwise fixed to outer elastic portion 46 as in the front mounting. In the rear mounting the fins are fixed to the chassis while housing 34, 35 rotates with the engine and transmission extension housing 53, but the relative movement between the mounting and fins 65 is substantially the same as before which indicates one of many possible variations.

In the embodiment of the invention there is shown an inner elastic portion and an outer elastic portion looking in a radial direction from the center of the mount with the inner elastic portion being about ten times the thickness and flexibility of the outer elastic portion. Of course, the number and relative dimensions and properties of these elastic portions may be varied without departing from the principles of the invention. The elastic portions may be provided with holes to obtain any desired flexibility. As can best be seen by reference to Figures 2, 4 and 5, there is a thickness of elastic material between the walls of the openings 42 and 43 and the ends of the intermediate relatively inelastic portions 49 and 50. This thickness of elastic material cushions the transition of the load from inner and outer elastic portions 45 and 46 to the outer elastic portion 46 as engine torque force fins 26 and 27 against the side walls of the openings 42 and 43. The sides of the openings 26, 27 in the inner and outer elastic portions 45, 46 may be formed so as to provide a relatively smooth transition from the lower spring rate to the higher spring rate, as by providing these walls with a slightly curved surface which is illustrated in Figure 2.

The mounting of this invention provides a relatively high flexibility for angular vibration at low engine torque thereby preventing resonance at idling speeds or speeds in excess thereof. In mounts of the prior art this was not possible because the same spring constant or flexibility was used for angular support at both low and high engine torques. In order to prevent a large angle of power plant rotation, a stiff elastic member was necessary as a restraint. The resonant frequency of the engine mounted with this stiffer member was necessarily high and, therefore, as the engine passed through this resonant frequency, severe vibrations were experienced. In this invention, a relatively low resonant frequency is first provided and even the low engine frequencies are greater than this resonant frequency and no serious vibrations result. At low, power plant torque, fins 26 and 27 rotate in openings 42 and 43 respectively in engagement with inner elastic portion 45 and elastic portions 45 and 46 provide the spring rate for restraint of torsional vibrations. When the power plant torque increases to a selected value the fins 26 and 27 engage the outer edges of the relatively inelastic portions 49 and 50 through the thickness of elastic material which cover these edges. This effectively removes the inner elastic portion from its function of vibration isolation, thereby making outer elastic member 46 operative alone to isolate torsional vibrations. The outer elastic portion 46 being stiffer provides the engine as mounted with a higher natural or resonant frequency and would be subject to the objectionable resonances at the low frequencies but by the time outer portion 46 only is engaged, the engine frequencies and exciting forces are such that serious resonance does not occur.

Looking at Figure 1 it is seen that the engine is mounted on axis 80 which is substantially the natural torque roll axis. The axis passes through the centers of the two mountings. By supporting an engine with the mountings of this invention, it is much easier to mount an engine on the natural torque roll axis which is very desirable because the extraneous vibrational forces are at a minimum here and, therefore, are easier to isolate.

This invention may be suitably employed for isolating vibrations between any two units, and as illustrated is employed to isolate vibrations between an internal combustion engine, designated by the numeral 21, which may be considered as one unit, and the frame or chassis supporting the internal combustion engine designated by the numeral 73, which may be considered as the other unit.

While the embodiment shown is circular in configuration and employs rubber portions for springs, the configuration and spring material can be altered without departing from the principles of this invention.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim as our invention:

1. A vibration isolating mounting for isolating vibrations between two units comprising an inner elastic portion, an outer elastic portion and an intermediate relatively inelastic portion, said outer elastic portion being affixed to one of said units and being spaced radially outwardly from said inner elastic portion and having a higher spring rate than said inner elastic portion, and intermediate relatively inelastic portion being affixed to both said inner and said outer elastic portions, rotatable means affixed to the other of said units and adapted for rotation as the torque on the other of said units is varied, said rotatable means operatively engaging the inner elastic portion for stressing said inner elastic portion in torsional shear and operatively engaging said intermediate relatively inelastic portion when the torque on the other of said units is equal to or above a selected value.

2. A vibration isolating mounting for isolating vibrations between two units comprising, an inner elastic portion, an outer elastic portion and an intermediate relatively inelastic portion, said outer elastic portion being affixed to one of said units and being spaced radially outwardly from said inner elastic portion and having a higher spring rate than said inner elastic portion, said intermediate relatively inelastic portion being affixed to both said inner and said outer elastic portions, said inner elastic portion having an opening extending radially outwardly through said intermediate relatively inelastic portion, means affixed to the other of said units positioned in said opening and adapted for rotation as the torque on other of said units is varied, said means affixed to the other of said units operatively engaging said inner elastic portion at torques below a selected value and operatively engaging said relatively inelastic portion when the torque on the other of said units is equal to or above said selected value.

3. The vibration isolating mounting of claim 2 in which the opening in the inner elastic portion diverges outwardly through said inner elastic portion so that the walls of said opening form curved surfaces, and in which said means affixed to the other of said units engages only the innermost portion of the curved surfaces of said opening at low torques and progressively engages a greater portion of one of the curved surfaces of said opening as the torque on the other of said units increases to said selected value whereby a gradual transition of the spring rate of the mounting is obtained as the torque of the other of said units increases to said selected torque value.

4. In a vibration isolating mounting for isolating vibrations between two units, a vibration mount comprising, an inner elastic portion, an outer elastic portion and an intermediate relatively inelastic portion, said outer elastic portion being affixed to one of said units and being spaced radially outwardly from said inner elastic portion and having a higher spring rate than said inner elastic portion, said intermediate relatively inelastic portion being affixed to both said inner and said outer elastic portions, said vibration mount having an opening extending radially outwardly through said inner elastic portion and said intermediate relatively inelastic portion, a member affixed to the other of said units positioned in the opening and extending radially outwardly therein and being rotatable with the other of said units as the torque on the other of said units is varied, said member and vibration mount each having a surface for engagement with one another, one of said surfaces being of non-radial configuration so that the surfaces on said member and vibration mount are engageable to bring said member into operative engagement with said inner elastic portion at torques below a selected value and are engageable to bring said member into operative engagement with said intermediate relatively inelastic portion at torques equal to or above said selected value.

5. A vibration isolating mounting for isolating vibrations between two units, comprising, an inner elastic portion, an outer elastic portion and an intermediate relatively inelastic portion, said outer elastic portion being affixed to one of said units and being spaced radially outwardly from said inner elastic portion and having a higher spring rate than said inner elastic portion, said intermediate relatively inelastic portion being affixed to both said inner and said outer elastic portions, said inner elastic portion having a pair of opposed openings extending radially outwardly through said intermediate relatively inelastic portion, means affixed to the other of said units positioned in said openings and adapted for rotation as the torque on the other of said units is varied, said means affixed to the other of said units operatively engaging said inner elastic portion at torques below a selected value and operatively engaging said relatively inelastic portion when the torque on the other of said units is equal to or above said selected value.

References Cited in the file of this patent
UNITED STATES PATENTS

| | | |
|---|---|---|
| 2,055,894 | Edwards et al. | Sept. 29, 1936 |
| 2,197,081 | Piron | Apr. 16, 1940 |
| 2,684,819 | Leggett et al. | July 27, 1954 |